United States Patent [19]

Simpson et al.

[11] Patent Number: 5,375,030
[45] Date of Patent: Dec. 20, 1994

[54] SURGE PROTECTION DEVICE AND SYSTEM

[75] Inventors: Christopher S. Simpson, Harrisville, R.I.; Kevin R. French, North Dighton; Stephen B. Proia, Attleboro, both of Mass.

[73] Assignee: Texas Instruments Incorporated, Dallas, Tex.

[21] Appl. No.: 127,658

[22] Filed: Sep. 27, 1993

[51] Int. Cl.⁵ .......................... H02H 3/22; H02H 9/04
[52] U.S. Cl. ..................................... 361/118; 361/111; 361/126
[58] Field of Search ............... 361/56, 54, 103, 111, 361/117, 118, 119, 126, 127, 129, 110, 120, 124

[56] References Cited

U.S. PATENT DOCUMENTS 4,939,619  7/1990  Borkowicz et al. ............... 361/117
5,224,008  6/1993  Popat et al. ....................... 361/56

Primary Examiner—Jeffrey A. Gaffin
Assistant Examiner—Ronald W. Leja
Attorney, Agent, or Firm—Russell E. Baumann; Richard L. Donaldson; René E. Grossman

[57] ABSTRACT

A surge protector particularly adapted for use with telecommunication equipment is non-conductive during normal operation and becomes conductive upon surge conditions of a first level and provides a short circuit condition when subjected to surge condition above a second, greater level. The protector comprises a semiconducting chip (16) disposed between first (32, 32') and second (30, 30') electrodes and is provided with an environmental seal (60, 60') shrunk about the outer peripheral surfaces of the electrodes while being non-adhering to both provide contaminant protection and free slidability of the electrodes within the sleeve.

11 Claims, 3 Drawing Sheets

SURGE PROTECTION DEVICE AND SYSTEM

BACKGROUND OF THE INVENTION

The field of the invention is that of surge protection systems and the invention relates more particularly to systems having solid state surge protection elements.

Solid state surge protection systems conventionally employ a surge protection device having a semiconducting element between a pair of electrodes. This element is arranged in the circuit to selectively conduct electrical energy between a portion of a telephone circuit and ground, for example, in the event the circuit experiences an electrical surge as a result of lightning or a short circuit or the like in the circuit, thereby to protect electrical components connected in the circuit from damage due to the surge condition. On occasion the circuit will experience an electrical surge which results in destruction of the semiconducting element so that the circuit components would not thereafter be protected against subsequently occurring electrical surge conditions. Accordingly, conventional surge protection systems typically incorporate means to move the electrodes into electrical engagement with each other following destruction of the semiconductor elements, thereby to maintain a short circuit condition between the electrodes to protect the circuit components against subsequently occurring surge conditions until such time as the semiconducting element is replaced. Frequently, difficulty is encountered in establishing and maintaining the desired short circuit condition between the electrodes following destruction of the semiconducting element.

In U.S. Pat. No. 5,224,088, issued Jun. 29, 1993 and assigned to the assignee of the present invention, a surge protection system comprising a circuit and a device is disclosed and claimed which provides first and second levels of surge protection for the circuit and for electrical components in the circuit. The device comprises a semiconducting element having first and second electrodes disposed in electrically conductive relation with respective opposite sides of the element and the element is normally operable to selectively conduct electrical energy between the electrodes to provide a first level of surge protection for the circuit. For example, in one embodiment the electrodes are connected to a portion of the telephone circuit and to ground respectively, and the semiconducting element is non-conductive under normal telephone circuit voltage conditions. The element becomes conductive on occurrence of selected surge voltages in the circuit due to lightning or the like for connecting the circuit to ground to protect the circuit and circuit components from the voltage surge. When the surge condition has passed the semiconducting element returns to its non-conductive condition permitting resumption of normal circuit operation. In that way the surge protection device provides a first level of surge protection for the circuit or system.

The electrodes are adapted to move toward each other to maintain a short circuit condition between the electrodes in the event the device is destroyed as a result of being subjected to a greater electrical surge exceeding the first level of surge protection as described above, thereby to provide a second level of surge protection. Typically for example, the device electrodes are resiliently engaged between spring-loaded electrical contact arms or the like to be biased together by the spring contact arm loading in the event the semiconducting element is destroyed by the noted greater surge conditions. A first one of the electrodes is disposed in electrical engagement with a limited portion of one side of the semiconducting element to selectively concentrate the electrical energy to the limited portion to ensure the establishment and maintenance of the desired short circuit condition between the electrodes in the event of element destruction. The first electrode comprises a disc part and post part of lesser cross-sectional size then the disc part. A distal end of the post part of the first electrode is secured in electrically conductive relation to the selected limited portion of the one side of the element whereby as destruction of the semiconducting element occurs the post part of the first electrode passes through the remains of the element to be electrically engaged in short circuit condition with the second electrode for providing the second level of surge protection. The second electrode has a recess therein and the opposite side of the semiconducting element is received within the recess ensuring alignment in predetermined relation to the second electrode. The disc part of the first electrode is coextensive with the second electrode and the semiconducting element is selected to be operable with either polarity. An environmental seal of an electrically insulative coating or the like is disposed over a portion of said one side of the semiconducting element around the post part of the first electrode. In one embodiment the seal is spaced from the disc part of the first electrode to facilitate movement of the electrodes into short circuit condition in providing the second level of surge protection. In another embodiment the seal is provided with a selected limited thickness and with brittleness to be readily broken by bias of the electrodes toward each other in the event of destruction of the semiconducting element to provide the second level of surge protection. In another embodiment the seal is selected to be destroyed by overheating of the semiconducting element resulting in destruction of the element thereby to facilitate movement of the electrodes short circuit condition.

While the surge protection device in accordance with the teachings of U.S. Pat. No. 5,224,008 is very effective in providing the desired first and second levels of surge protection there is a need to provide an environmental seal which is more easily installed having the desired operational parameters of protecting the semiconducting element and the interfaces of the electrodes from contamination including humidity, salt, dust particles and the like without interfering with the collapsing motion of the electrodes upon destruction of the semiconducting element in providing the second level of surge protection.

BRIEF SUMMARY OF THE INVENTION

It is an object of the invention to provide a novel and improved surge protection system having an environmental seal for a surge protection device in which first and second electrodes are adapted to collapse toward each other into electrically conductive relation with one another upon destruction of a semiconducting element disposed between the electrodes in providing a selected level of surge protection.

Briefly, in accordance with the invention, the novel and improved surge protection system of the invention comprises a circuit having an environmental seal for a surge protection device providing first and second levels of surge protection for the circuit and for the electrical components in the circuit. The surge protection device comprises a semiconducting element having first and second electrodes disposed in electrically conductive relation with respective opposite sides of the element and the element is normally operable to selectively conduct electrical energy between the electrodes to provide a first level of surge protection for the circuit. For example, in one preferred embodiment, the electrodes are connected to a portion of a telephone circuit and to ground respectively, and the semiconducting element is non-conductive under normal telephone circuit voltage conditions. The element becomes conductive on occurrence of selected surge voltage in the circuit due to lightning or the like for connecting the circuit to ground to protect the circuit and circuit components from the voltage surge. When the surge condition has passed, the semiconducting element returns to its non-conductive condition permitting resumption of normal circuit operation thereby providing a first level of surge protection.

In the event the device is subjected to a greater electrical surge exceeding the first level, a second level of protection is provided by the destruction of the semiconducting element and concomitantly the collapsing or moving together of the electrodes into electrical engagement with one another under the influence of external spring-loaded electrical contact arms engaging the terminals.

The electrodes of the device have outer peripheral surfaces which are coextensive with one another and an environmental seal is provided comprising a sleeve formed of electrically insulative, heat shrinkable material shrunk onto the outer peripheral surfaces of the electrodes. The sleeve is in intimate sealing engagement with the outer peripheral surfaces of the electrodes without inhibiting sliding motion of the electrodes upon destruction of the semiconductor element under the influence of conventional contact arm loading. The length of the sleeve is selected so that it is shorter than the distance between the outer face sides of the electrodes following destruction of the semiconductor element to avoid any interference between the outer face sides of the electrodes and contact arms adapted for engagement therewith. In one preferred embodiment, the semiconductor chip is disposed in a recess formed in one of the electrodes which places the element in selected alignment with the other electrode. In another preferred embodiment, the semiconducting element is disposed on a flat electrode surface with alignment of the semiconducting element between the electrodes being effected through appropriate fixturing during the assembly process. The fixturing has a given tolerance resulting in the possibility of an edge portion of the semiconducting element protruding out beyond the outer peripheral surfaces of the electrodes. In order to protect the semiconducting element from mechanical damage due to handling and the like, the thickness of the sleeve is chosen to be greater, after shrinking, than the given tolerance so that the edge cannot protrude through the sleeve. As a result, the outer diameter of the electrodes can be reduced to thereby reduce the overall size of the device. According to a feature of the invention, the sleeve can be provided with different colors coded to provide product differentiation.

BRIEF DESCRIPTION OF THE DRAWINGS

Other objects, advantages and details of the novel and improved surge protector device and system of the invention appear in the following detailed description of preferred embodiments of the invention, the detailed description referring to the drawings in which.

DESCRIPTION OF THE PREFERRED EMBODIMENTS

Figure 1:
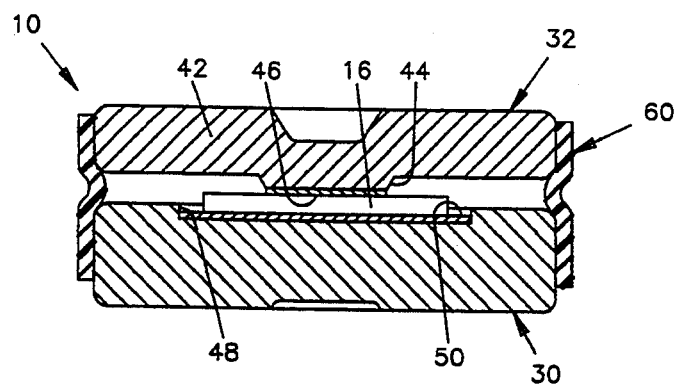
FIG. 1 is a cross sectional view a surge protector device made in accordance with the invention.
Figure 2:
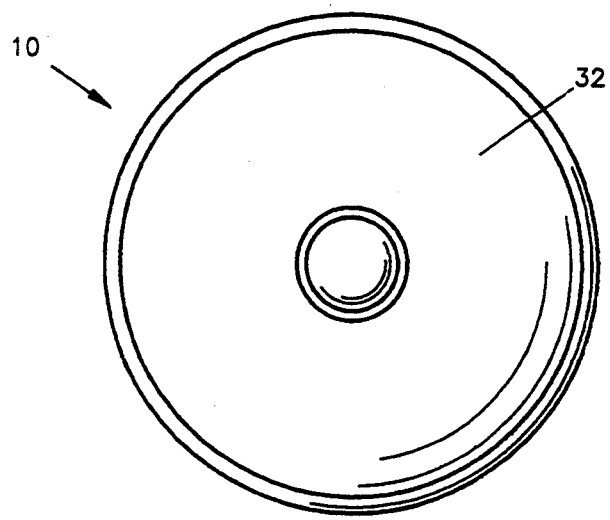
FIG. 2 is a top view of the FIG. 1 device.
Figure 3:
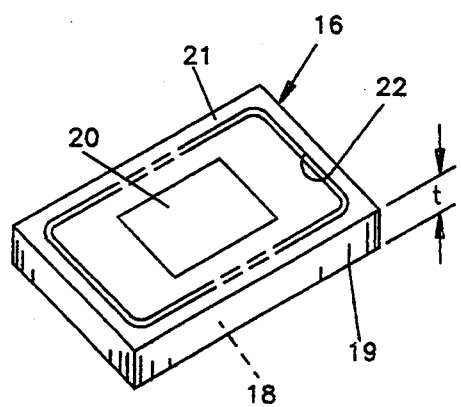
FIG. 3 is a perspective view of a semiconductor element used in the FIG. 1 device.
Figure 4:
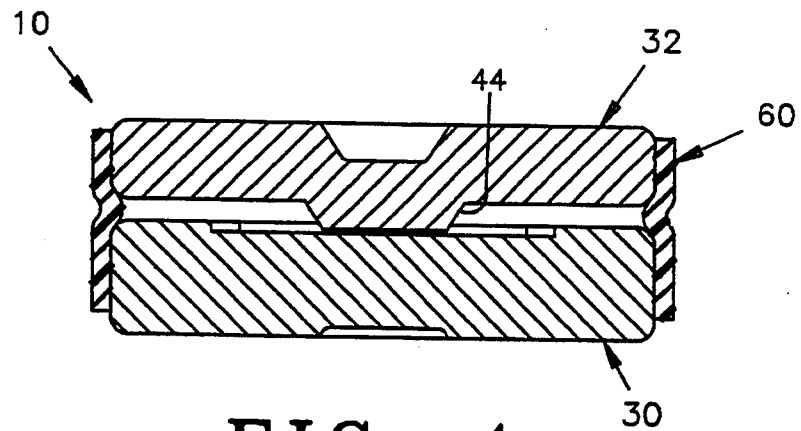
FIG. 4 is a view similar to FIG. 1 illustrating the device in shorted condition.
Figure 5:
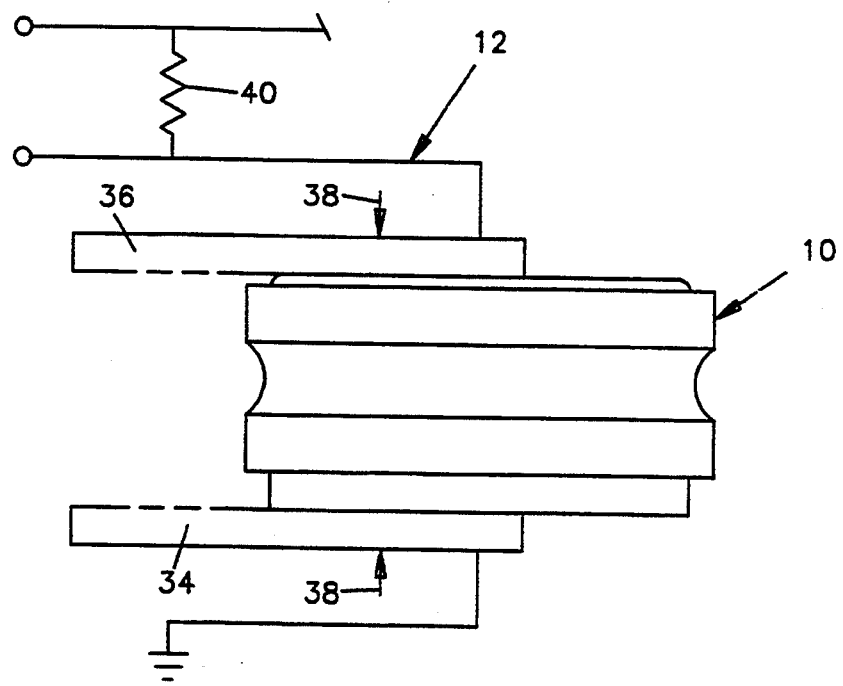
FIG. 5 is a schematic view of the FIG. 1 protector device in a surge protection system used to protect an operating telephone circuit for example.
Figure 6:
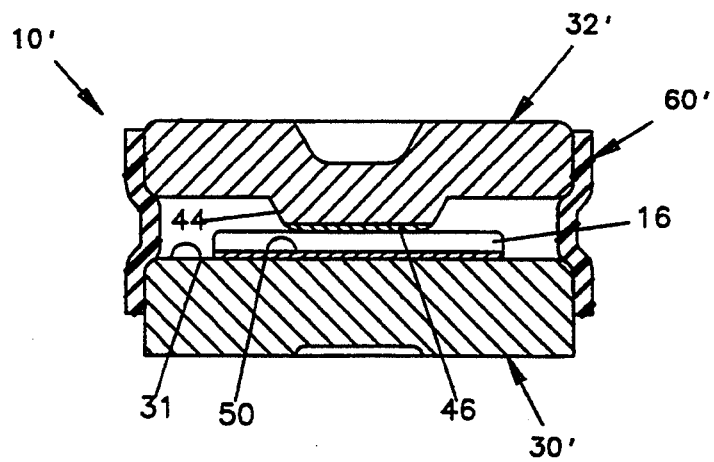
FIG. 6 is a cross sectional view similar to FIG. 1 but of an alternate embodiment.

Referring to the drawings, numeral 10 in FIGS. 1, 2 and 4 indicates a preferred embodiment of the novel and improved surge protection device by itself and in FIG. 5 as used in a system. In FIG. 5 the system is shown to include a circuit 12 and a surge protector device 10 arranged to provide first and second levels of surge protection for the circuit 12. The surge protection device includes a semiconducting surge protection element 16 (see FIG. 3) having a first terminal 18 on a bottom side 19 of the element and a second terminal 20 on a top side 21 of the element. The surge protecting element 16 is of a generally conventional type. Preferably the element comprises a silicon semiconducting body having a reverse breakdown PN junction. In a preferred embodiment of the invention the element comprises a bidirectional silicon semiconductor such as a TR730YQ element made and sold by Texas Instruments Incorporated having a critical energy conduction path through the element defined between a selected limited portion of side 21 and another opposite side 19. Terminal surface 18 on side 19 extends up over the sides to a point indicated by broken line 22 spaced inwardly from the outer periphery of the element on the opposite side 21 and spaced from terminal surface 20 on the said opposite side. Typically, the semiconductor element has a rectangular configuration as shown in FIG. 3 although elements of other outlines are also possible within the scope of the invention. Typically a portion of the semiconductor element such as the side inboard of the marginal surface indicated by broken line 22, requires some type of environmental seal to protect the portion from corrosion or the like or prevent shorting between the terminals of the element by moisture or the like without interfering with movement of the surge protector electrodes in providing the second level of surge protection to be described below.

Surge protection device 10 has electrodes 30 and 32 disposed in electrically conductive relation with respective opposite sides 19, 21 of the element. The semiconductor element is normally non-conductive but is adapted to become conductive when a selected level of voltage is applied to the element across the electrodes, thereby to provide a first level of surge protection for the circuit. The semiconducting element is adapted to become non-conducting again following removal of the voltage surge condition to permit resumption of normal operation of the circuit 12.

The electrodes are arranged to move toward each other and to be electrically engaged with each other in short circuit condition in the event the semiconductor element is destroyed by an electrical surge in the circuit exceeding the first level of surge protection, thereby to provide a second level of surge protection and assure that the circuit is protected against subsequent surge conditions until the device with the destroyed semiconducting element has been replaced. Typically, for example, contact arms 34, 36 in the circuit 12 are resiliently biased as indicated by arrows 38 by spring means or the like to provide a contact loading for example of 3–5 pounds. Contact arm 36 is shown connected in a line in a telephone system and contact arm 34 is shown being connected to ground as diagrammatically indicated in FIG. 5. In that way, device 10 is adapted to protect telephone circuit components 40 against a first level of surge protection with only temporary interruption of the telephone circuit but if a second relatively greater level of electrical surge occurs in the system such as would destroy the semiconducting surge protector element, the device provides a second level of surge protection to protect the circuit and circuit components until the device with the destroyed element is replaced.

In accordance with the invention, the first electrically conductive electrode 32 through its geometric configuration is disposed in electrically conductive relation to a limited part of one side of the semiconducting element 16. Preferably, for example, the first electrode is provided with a disc part 42 having a centrally disposed node part 44 of lesser cross sectional size than the disc part depending downwardly from the disc part as seen in FIGS. 1 and 4. The lower surface of the node part is provided with a solder coating 46 and is secured in electrically conductive relation to the desired limited part of the element side 21. Preferably, for example, the lower surface of node part 44 is soldered to the terminal 20 to dispose the node part of the first electrode in electrically and thermally conductive engagement with the selected limited portion of the element side 21 which defines the critical energy conduction path as above described. Where the element is bidirectional the node part 44 and terminal 20 are arranged to overlap the preferential conduction path in each direction as noted above. The node part 44 of the first part extends away from the disc part 42 a distance which at least equals and which preferably exceeds the thickness t of the semiconductor element 16.

The surge protector device 10 further comprises a second electrically conductive electrode 30 which is disposed in electrically conductive relation to the opposite side 19 of the semiconducting element. The second electrode 30 is provided with a recess 48 which receives a semiconductor element 16 therein for aligning the element in predetermined position relative to the second electrode. Preferably a layer of solder material 50 is provided in recess 48 for receiving element 16 thereon and the solder is melted for securing the entire side 19 of the semiconducting element in secure, electrically and thermally conductive relation to the electrode. Where the electrodes are formed of copper or copper alloy having high thermal conductivity, they serve to rapidly dissipate heat from the semiconducting element in providing the noted first level of surge protection. The first and second electrodes are coextensive as shown in FIG. 1 so that disposition of the electrodes aligned in coextensive relation with each precisely positions node 44 of electrode 32 with the critical energy conduction path defined under terminal 20 of the element. Preferably, the element 16 is selected to be bidirectional or operable with alternate polarity and the coextensive electrodes permit the device 10 to be accommodated between arms 34, 36 or other contact engagement means with alternate polarity and without requiring any particular orientation as it is installed in a system as shown in FIG. 5.

In accordance with the invention, a seal is provided for device 10 comprising a sleeve 60 formed of electrically insulating, heat shrinkable material. Sleeve 60 is chosen having a length, after shrinking, of less than the outer surfaces of electrodes 30, 32 with the semiconducting element 16 removed so that the length of the sleeve will not interfere with collapsing movement of the electrodes under the influence of the spring-loaded contact arms upon destruction of semiconducting element 16 in providing the second level of surge protection. Sleeve 60 is formed of material which conforms closely to the coextensive outer peripheries of electrodes 30, 32 without adhering to the electrode surfaces. The close conformance of the sleeve to the electrode surfaces prevents entry of contaminants, moisture, salt, dust particles and the like from entering the space between disc part 42 of electrode 32 and electrode 30 while the non-adherence of the sleeve to the electrode surfaces allows the electrodes to slide, without interference, toward each other within the sleeve into short circuit condition as shown in FIG. 4 upon the occurrence of a surge condition which results in destruction of semiconductor element 16. Polyvinylidene fluoride/polyolefin blend such as KVF 100 3/16 BLK SPL having 120° C. shrink temperature has been found to be a suitable material being both semi-rigid and not adherent to the electrodes. Other heat shrinkable materials could be employed, if desired, such as mylar, a trademark of DuPont de Nemours for polyethylene terephthalate, polyolefin, PVC, teflon, a trademark of DuPont de Nemours for polytrafluorethylene, elastomers and silicon rubber.

In assembling the device, after the semiconducting element 16 has been soldered to electrodes 30, 32, a sleeve of suitable heat shrinkable material, such as polyvinylidene fluoride/polyolefin blend mentioned above, having an inside diameter slightly larger than the diameter of the outer peripheral surface of the electrodes is loosely placed over the electrodes and heat in the form of IR light, forced hot air, hot air convection, UV light or the like is applied to the sleeve causing it to shrink tightly about the electrodes.

Figure 7:
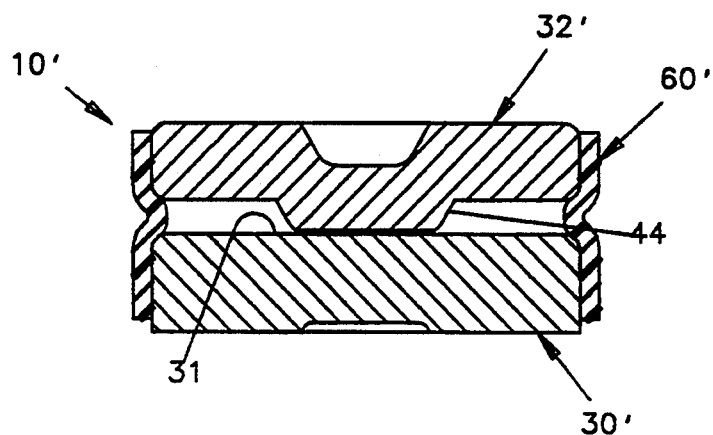
FIG. 7 is a view similar to FIG. 4 illustrating FIG. 6 the device in shorted condition.

In operation, where device 10 is subjected to the above noted surge conditions exceeding the first level of surge protection semiconductor device 10 is destroyed and the electrodes 30, 32 slide together within sleeve 60 under the influence of the spring-loaded contact arms 34, 36 with node 44 electrically engaging terminal 30 through the melted solder thereby maintaining a short circuit condition, as shown in FIGS. 4 and 7. Node 44 pierces through the shattered material of element 16 which is pushed into the remaining space between the electrodes around node 44.

In another preferred embodiment electrode 30' is formed with a flat electrode surface 31, that is without a recess to align semiconductor element 16. In this embodiment appropriate fixturing tools are relied upon to align the semiconductor element and the electrodes. As a result the device can be made having a smaller outside diameter and can more easily be fit into the limited space available in many applications. For example, a device made in accordance with this embodiment can have electrodes having an outer diameter in the order of 0.200 inches. Due to tolerance requirement of the fixturing tools, an edge of semiconductor element 16 could end up protruding beyond the outer peripheral surfaces of the electrodes by up to 0.003 inches; however, sleeve 60' is chosen to have a wall thickness greater than that, e.g., 0.006–0.008 after shrinkage so that the element is protected by the sleeve from damage due to handling and the like while at the same time providing a device with minimized package dimensions.

Another advantage offered by the structure of the present invention is the improved over surface clearance between one electrode to another to reduce the leakage path in the presence of moisture versus prior art approaches which employ a seal disposed between the electrodes.

The present invention also provides a convenient mechanism for providing product differentiation by using different selected colors as a code for devices having different electrical characteristics.

It should be understood that although particular embodiments of the invention have been described by way of illustrating the invention, the invention includes all modifications and equivalents of the disclosed embodiment within the scope of the appended claims.

We claim:

1. A surge protection system having a circuit and a surge protecting device for providing a first level of surge protection and a second higher level of surge protection for the circuit, the surge protecting device comprising a semiconducting element having two opposite sides, a first electrode having an outer periphery, said first electrode in electricallly conductive engagement with one of the sides of the element, a second electrode having an outer periphery, said second electrode in electrically conductive engagement with the other side of the element, the element being operable to selectively conduct electrical energy between the electrodes to provide said first level of surge protection, the electrodes further being adapted to move into electrically conductive relation with each other to maintain a short circuit condition between the electrodes in the event of element destruction thereby providing said second higher level of surge protection, and a sleeve formed of electrically insulative, heat shrinkable material, the first and second electrodes received within the sleeve and the sleeve being shrunk onto the outer peripheries of the first and second electrodes in close conformance to the outer peripheries of said electrodes while being non-adhering to both provide contaminant protection and free slidability of the electrodes within the sleeve.

2. A surge protection system according to claim 1 in which the first and second electrodes have coextensive, outer circular peripheral surfaces having a diameter less than approximately 0.200 inches, the semiconducting element has a rectangular configuration and the sleeve has a wall thickness in the range of approximately 0.006–0.008 inches, whereby the semiconducting element, which can protrude beyond the outer periphery of the electrodes by up to approximately 0.003 inches due to tolerances involved in assembly the surge protecting device, is protected from mechanical damage due to handling and the like.

3. A surge protection system according to claim 1 in which an upper surface of the second electrode is formed with a recess, the semiconducting elements is received into the recess.

4. A surge protection system according to claim 1 in which the sleeve is formed of polyvinyledene fluoride/polyolefin blend.

5. A surge protection system according to claim 1 in which the sleeve is color coded according to selected electrical characteristics of the surge protecting device.

6. A surge protection system according to claim 1 in which the first electrode has a bottom surface with a centrally disposed node depending downwardly therefrom and being adapted to be placed in electrical engagement with a central portion of one of the two opposite sides of the semiconducting element.

7. A surge protection system according to claim 6 in which the first and second electrodes have coextensive, outer circular peripheral surfaces having a diameter less than approximately 0.200 inches, the semiconducting element has a rectangular configuration and the sleeve has a wall thickness in the range of approximately 0.006–0.008 inches, whereby the semiconducting element, which can protrude beyond the outer periphery of the electrodes by up to approximately 0.003 inches due to tolerances involved in assembling the surge protecting device, is protected from mechanical damage due to handling and the like.

8. A surge protection system according to claim 6 in which the upper surface of the second electrode is formed with a recess, the semiconducting element is received into the recess.

9. A surge protection system according to claim 6 in which the sleeve is formed of polyvinyledene fluoride/polyolefin blend.

10. A surge protection system according to claim 6 in which the sleeve is color coded according to selected electrical characteristics of the surge protecting device.

11. A surge protector comprising a semiconducting element having two opposite sides, a first electrode having an outer periphery, said first electrode in electrically conductive engagement with one of the sides of the element, a second electrode having an outer periphery, said second electrode in electrically conductive engagement with the outer side of the element, the element being operable to selectively conduct electrical energy between the electrodes to provide a first level of surge protection, the electrodes being adapted to move into electrically conductive relation with each other to maintain a short circuit condition between the electrodes in the event of element destruction thereby providing a second higher level of surge protection, and a sleeve of electrically insulative, heat shrinkable material, the first and second electrodes received within the sleeve and the sleeve being shrunk onto the outer peripheries of the first and second electrodes in close conformance to the outer peripheries of the said electrodes while being non-adhering to both provide contaminant protection and free slidability of the electrodes within the sleeve.

* * * * *